United States Patent
Mukai et al.

(10) Patent No.: US 11,605,978 B2
(45) Date of Patent: Mar. 14, 2023

(54) WIRELESS CHARGING UNIT ATTACHED TO A CASE

(71) Applicant: TOYODA GOSEI CO., LTD., Kiyosu (JP)

(72) Inventors: Takahiro Mukai, Kiyosu (JP); Yuhki Ichikawa, Kiyosu (JP); Minoru Shibata, Kiyosu (JP)

(73) Assignee: TOYODA GOSEI CO., LTD., Kiyosu (JP)

(*) Notice: Subject to any disclaimer, the term of this patent is extended or adjusted under 35 U.S.C. 154(b) by 229 days.

(21) Appl. No.: 17/097,254

(22) Filed: Nov. 13, 2020

(65) Prior Publication Data
US 2021/0175746 A1 Jun. 10, 2021

(30) Foreign Application Priority Data
Dec. 9, 2019 (JP) .............................. JP2019-222281

(51) Int. Cl.
| | | |
|---|---|---|
| *H01M 10/46* | (2006.01) | |
| *H02J 50/10* | (2016.01) | |
| *H02J 7/02* | (2016.01) | |
| *B60R 7/04* | (2006.01) | |
| *H02J 50/00* | (2016.01) | |
| *B60R 16/02* | (2006.01) | |
| *H02J 7/00* | (2006.01) | |

(52) U.S. Cl.
CPC ............... *H02J 50/10* (2016.02); *B60R 7/04* (2013.01); *B60R 16/02* (2013.01); *H02J 7/0044* (2013.01); *H02J 7/02* (2013.01); *H02J 50/005* (2020.01)

(58) Field of Classification Search
CPC .. H02J 50/10; H02J 50/005; H02J 7/02; H02J 7/0044; H02J 7/0042; B60R 7/04; B60R 16/02
USPC .......................... 320/104, 107, 108, 114, 115
See application file for complete search history.

(56) References Cited

U.S. PATENT DOCUMENTS

| | | |
|---|---|---|
| 9,871,383 B2 | 1/2018 | Park et al. |
| 10,033,218 B2 | 7/2018 | Kanahara et al. |

(Continued)

FOREIGN PATENT DOCUMENTS

| | | | |
|---|---|---|---|
| CN | 103840517 A | 6/2014 | |
| DE | 102020133299 A1 * | 6/2021 | ............... B60N 2/79 |

(Continued)

OTHER PUBLICATIONS

Google translation of KR101483149B1 (Year: 2015).*
Japanese Office Action, dated Aug. 9, 2022, in Japanese Application No. 2019-222281 and English Translation thereof.

*Primary Examiner* — Edward Tso
(74) *Attorney, Agent, or Firm* — McGinn I. P. Law Group, PLLC

(57) ABSTRACT

A wireless charging unit to be attached to a back surface of a side wall of a case in which an electronic device including internally a wireless power receiving coil is placed upright. The wireless charging unit includes a power supplying coil provided at a position facing the back surface of the side wall of the case to wirelessly supply power, circuit board connected to the power supplying coil to feed a current to the power supplying coil, and a housing that houses the circuit board. The center of the power supplying coil is located above the center of the housing in an in-plane direction of the power supplying coil.

20 Claims, 6 Drawing Sheets

(56) References Cited

U.S. PATENT DOCUMENTS

| | | | |
|---|---|---|---|
| 2013/0154555 A1* | 6/2013 | Miller | H02J 7/0042 320/108 |
| 2015/0288196 A1 | 10/2015 | Park et al. | |
| 2016/0164335 A1 | 6/2016 | Kanahara et al. | |

FOREIGN PATENT DOCUMENTS

| | | | |
|---|---|---|---|
| JP | 2012-236477 A | 12/2012 | |
| JP | 2015-202038 A | 11/2015 | |
| JP | 6013437 B2 | 10/2016 | |
| JP | 2019-094027 A | 6/2019 | |
| KR | 101461101 B1 | 11/2014 | |
| KR | 101483149 B1 * | 1/2015 | |

* cited by examiner

WIRELESS CHARGING UNIT ATTACHED TO A CASE

CROSS-REFERENCE TO RELATED APPLICATIONS

The present application is based on Japanese patent application No. 2019-222281 filed on Dec. 9, 2019, the entire contents of which are incorporated herein by reference.

TECHNICAL FIELD

The invention relates to a wireless charging unit.

BACKGROUND ART

A housing portion in a vehicle for housing an electronic device such as mobile phone is known which is provided with an electronic device-wireless charging function (see, e.g., JP 2019/94027 A).

JP 2019/94027 A discloses a door trim structure in which a housing portion for housing an electronic device is provided on an armrest of a door trim of a vehicle and a power supplying coil for wirelessly supplying power is arranged on the back side of a side wall of the housing portion, i.e., inside the armrest.

SUMMARY OF INVENTION

JP 2019/94027 A, however, does not disclose any specific structure of the wireless charging device and a maintainability thereof is unknown. The power charging device, which is an electronic device, is desired to be easily attached and detached to/from the electronic device-housing portion to increase the maintainability.

On the other hand, a power receiving coil included in the electronic device to wirelessly receive power is generally arranged near the center of the electronic device and the depth of the housing portion for placing such an electronic device is set to be larger than the length of the electronic device as shown in JP 2019/94027 A. Therefore, the electronic device placed in the housing portion may be completely hidden inside the housing portion and difficult to see from the outside. As a result, the electronic device may be left therein.

It is an object of the invention to provide a wireless charging unit which is attachable/detachable to/from an electronic device-housing case in a vehicle and has a structure allowing an electronic device to be placed in the case at a position at which the electronic device can be charged, can be easily taken out and can be easily seen from the outside.

According to an embodiment of the invention, a wireless charging unit defined by [1] to [5] below can be provided.
[1] A wireless charging unit to be attached to a back surface of a side wall of a case in which an electronic device comprising internally a wireless power receiving coil is placed upright comprising a power supplying coil provided at a position facing the back surface of the side wall of the case to wirelessly supply power, a circuit board connected to the power supplying coil to feed a current to the power supplying coil, and a housing that houses the circuit board, wherein the center of the power supplying coil is located above the center of the housing in an in-plane direction of the power supplying coil.
[2] The wireless charging unit according to [1] above wherein lead wires led out from the power supplying coil are led out to the upper side of the housing.
[3] The wireless charging unit according to [1] or [2] above, wherein a distance between the upper end of the power supplying coil and the upper end of the housing in the in-plane direction of the power supplying coil is not more than 1 cm.
[4] The wireless charging unit according to any one of [1] to [3] above, wherein the housing comprises an opening provided on a surface facing the back surface of the side wall of the case to expose the power supplying coil, and the power supplying coil is arranged within the opening.
[5] The wireless charging unit according to any one of [1] to [4] above, wherein the case is installed on a center console of a car.

Advantageous Effects of Invention

According to an embodiment of the invention, it is possible to provide a wireless charging unit which is attachable/detachable to/from an electronic device-housing case in a vehicle and has a structure allowing an electronic device to be placed in the case at a position at which the electronic device can be charged, can be easily taken out and can be easily seen from the outside

DESCRIPTION OF EMBODIMENTS

Embodiment (Configuration of Wireless Charging Case)

Figure 1:
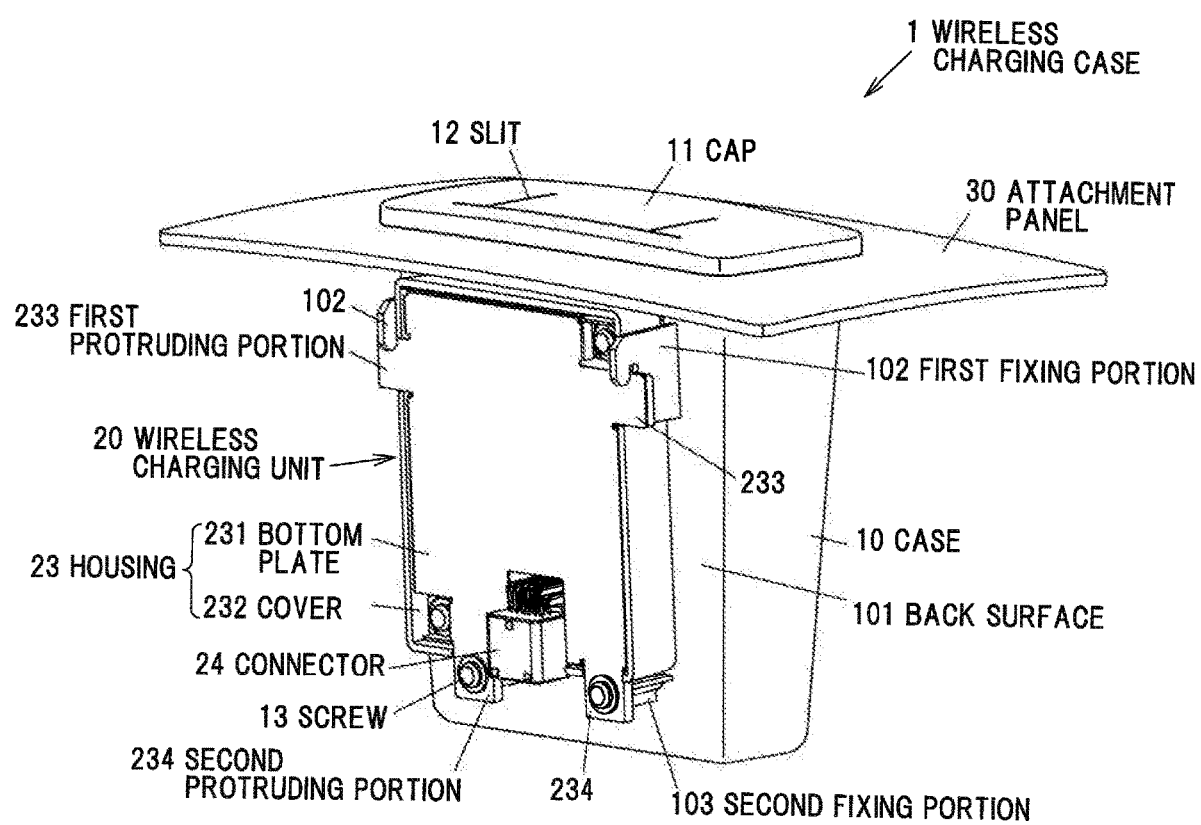
FIG. 1 is a perspective view showing a wireless charging case in an embodiment of the present invention.

FIG. 1 is a perspective view showing a wireless charging case 1 in an embodiment of the invention. The wireless charging case 1 is provided with a case 10, and a wireless charging unit 20 having internally a power supplying coil for supplying power to an electronic device placed in the case 10. The electronic device to be placed in the case 10 here is typically a mobile phone such as smartphone.

In the wireless charging case 1, wireless charging is performed via electromagnetic induction between the power supplying coil of the wireless charging unit 20 and a power receiving coil of the electronic device placed in the case 10. By placing (inserting) the electronic device into the case 10, the power supplying coil of the wireless charging unit 20 and the power receiving coil of the electronic device come close in a substantially parallel manner and charging via electromagnetic induction is initiated.

The case 10 is a pocket-type container which opens upward and in which the electronic device is placed upright.

Upright here means the position at which a shorter side surface of the electronic device faces the inner bottom surface of the case 10.

Figure 2:
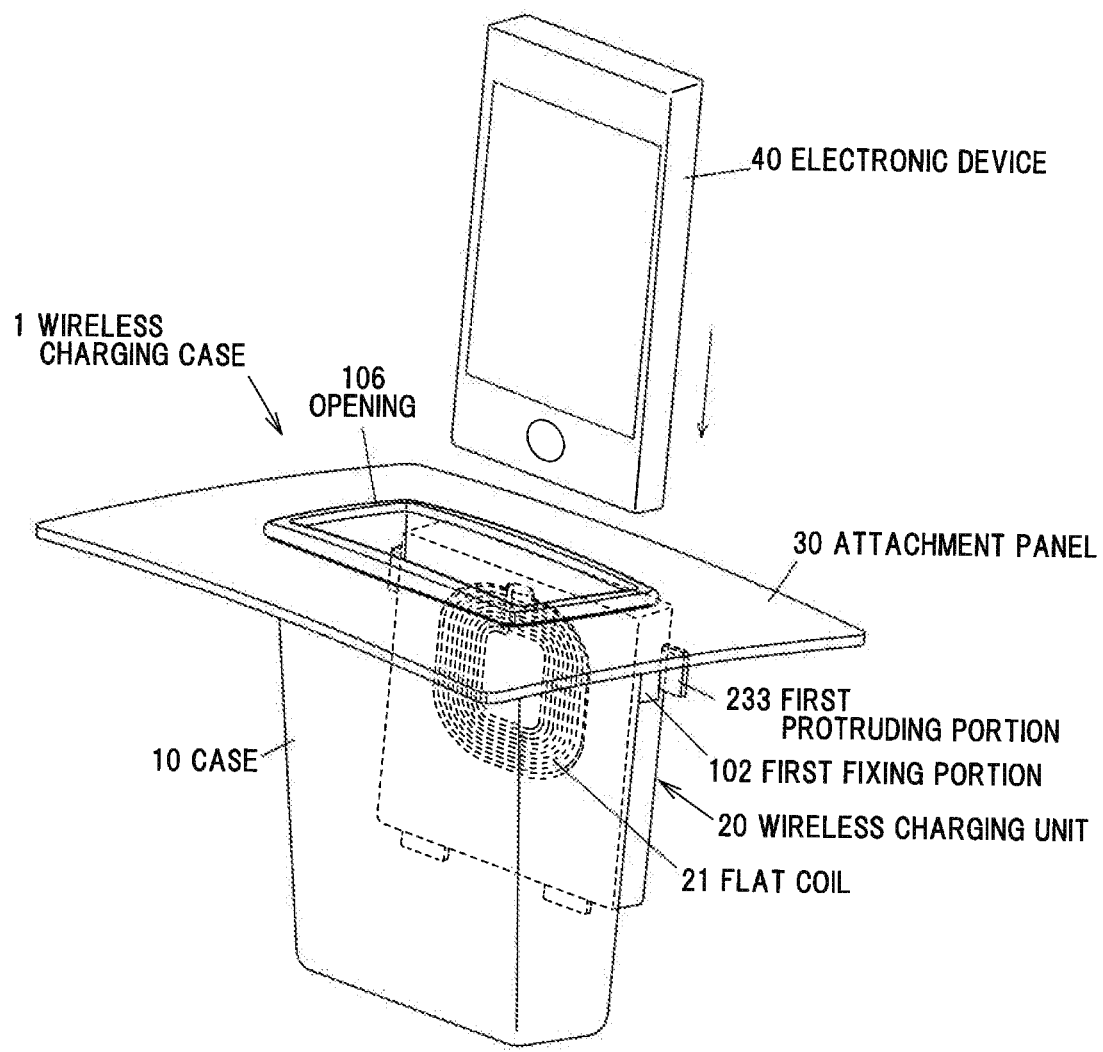
FIG. 2 is a schematic diagram illustrating how to place an electronic device into a case.

FIG. 2 is a schematic diagram illustrating how to place an electronic device 40 into the case 10. As shown in FIG. 2, the upright electronic device 40 is inserted from above into an opening 106 of the case 10 and is placed in the case 10.

The case 10 may have a cap 11 covering the opening 106, as shown in FIG. 1. The cap 11 has a slit 12, and the electronic device can be placed inside the case 10 by inserting the electronic device into the slit 12. The cap 11 can prevent rattling of the electronic device by holding the electronic device placed in the case 10 during when the vehicle is in motion, or can prevent spilt drink, etc., from entering inside the case 10.

The case 10 is, e.g., fitted to an opening of a plate-shaped attachment target object. In the example shown in FIG. 1, the case 10 is fitted and fixed to an opening of an attachment panel 30.

Figure 3:
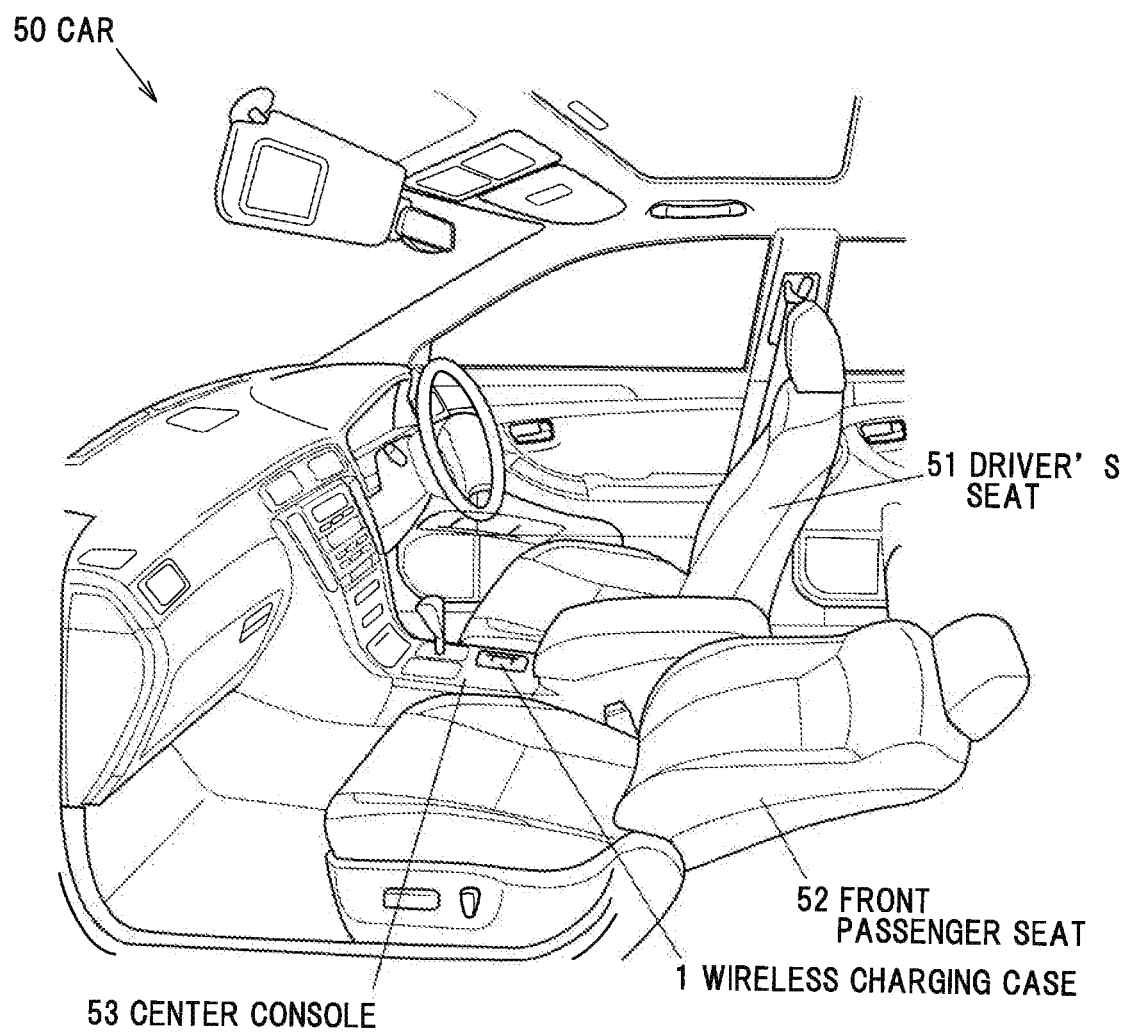
FIG. 3 is a schematic diagram illustrating an installation position of the wireless charging case in the embodiment of the invention.

FIG. 3 is a schematic diagram illustrating an installation position of the wireless charging case 1. In the example shown in FIG. 3, the wireless charging case 1 is installed on a center console 53 which is arranged between a driver's seat 51 and a front passenger seat 52 of a car 50. In this case, an upper panel of the center console 53 serves as the attachment panel 30.

In case that the wireless charging case 1 is installed on the center console 53, since both an occupant sitting in the driver's seat 51 and an occupant sitting in the front passenger seat 52 can easily reach the vicinity of the wireless charging case 1, both the occupants can use the wireless charging case 1 and can place and take out the electronic device into/from the wireless charging case 1 without taking a cramped posture.

Figure 4:
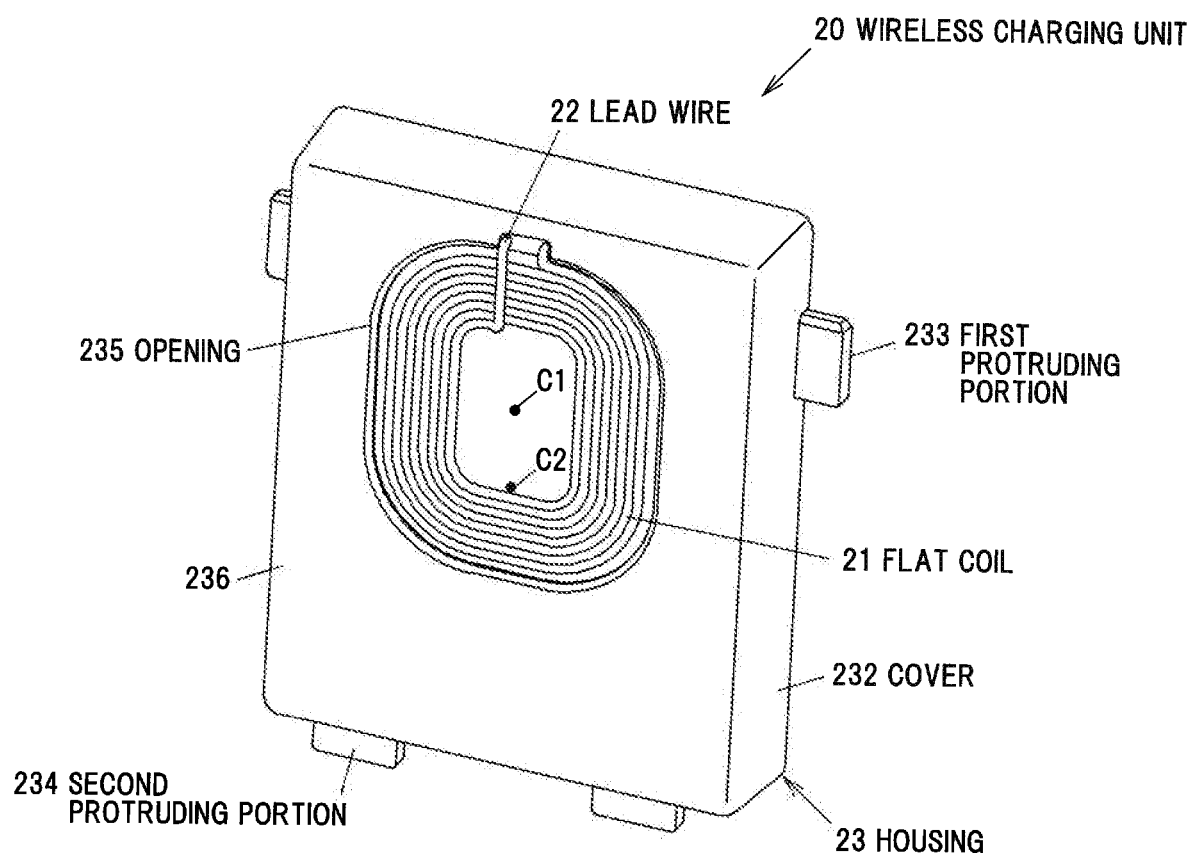
FIG. 4 is a perspective view showing a wireless charging unit in the embodiment of the invention.

FIG. 4 is a perspective view showing the wireless charging unit 20. The wireless charging unit 20 has one power supplying coil 21 for wirelessly supplying power, a circuit board 25 (see FIG. 5) which has a circuit for applying a power supply current to the power supplying coil 21 and connected to the power supplying coil 21, a housing 23 housing the circuit board 25, and a connector 24 connected to the circuit board 25 to externally supply power. The power supplying coil 21 is typically a flat coil.

In the example shown in FIGS. 1 and 2 and FIG. 5 (described later), the housing 23 has a metal bottom plate 231 on which the circuit board 25 is mounted, a metal upper plate 237 placed on the bottom plate 231 so that the circuit board 25 is covered, and a resin cover 232 arranged on the outer side of the upper plate 237 and fixed to the bottom plate 231. By arranging the upper plate 237 between the power supplying coil 21 and the circuit board 25, it is possible to eliminate electromagnetic noise.

The wireless charging unit 20 is configured that a center $C_1$ of the power supplying coil 21 is located above a center $C_2$ of the housing 23 (located on the side closer to the opening 106 of the case 10 in the state that the wireless charging unit 20 is attached to the case 10) in an in-plane direction of the power supplying coil 21. Here, the directions such as upper/above and lower/below when describing the wireless charging unit 20 refer to the directions in the state that the wireless charging unit 20 is attached to the case 10.

The wireless charging unit 20 is removably attached to a back surface 101 (an outer surface) of a side wall of the case 10. Since components for wireless charging can be attached and detached as the wireless charging unit 20 to/from the case 10, maintainability is excellent. The power supplying coil 21 is provided at a position facing the back surface 101 of the side wall of the case 10 in the state that the wireless charging unit 20 is attached to the back surface 101 of the side wall of the case 10.

In the example shown in FIG. 1, plate-shaped first protruding portions 233 protruding sideward from both sides of the upper portion of the housing 23 are fitted and fixed to first fixing portions 102 provided on the back surface 101 of the side wall of the case 10, and second protruding portions 234 protruding downward from the lower edge of the housing 23 are fixed by screws 13 to second fixing portions 103 provided on the back surface 101 of the side wall of the case 10, hence, the wireless charging unit 20 is attached to the back surface 101 of the side wall of the case 10. The first protruding portions 233 and the second protruding portions 234 are constructed from, e.g., part of the bottom plate 231 and part of the cover 232.

The housing 23 may have an opening 235 which is formed on a surface 236 facing the back surface 101 of the side wall of the case 10 to expose the power supplying coil 21. By arranging the power supplying coil 21 within the opening 235, it is possible to arrange the power supplying coil 21 close to the surface of the wireless charging unit 20 (a surface on the case 10 side). This allows the power supplying coil 21 to easily come close to the power receiving coil of the electronic device placed in the case 10, to a distance appropriate for wireless charging, e.g., about 5 mm. In the example shown in FIG. 4, the opening 235 is provided on the cover 232.

When the power supplying coil 21 can come sufficiently close to the power receiving coil of the electronic device, the surface of the power supplying coil 21 may be covered with the cover 232. In this case, it is possible to prevent deposition of water due to condensation, etc., on the power supplying coil 21. Alternatively, the surface of the power supplying coil 21 may be covered with a component other than the cover 232, such as a noise reduction filter.

The size and shape of the power supplying coil 21 are set according to, e.g., the standard for wireless charging. The shape of the power supplying coil 21 is typically a rounded-corner rectangle as shown in FIG. 4 or a circle, but other shapes such as a rounded-corner triangle or an oval shape may be adopted to, e.g., adjust the position at which power can be supplied to the electronic device.

Figure 5:
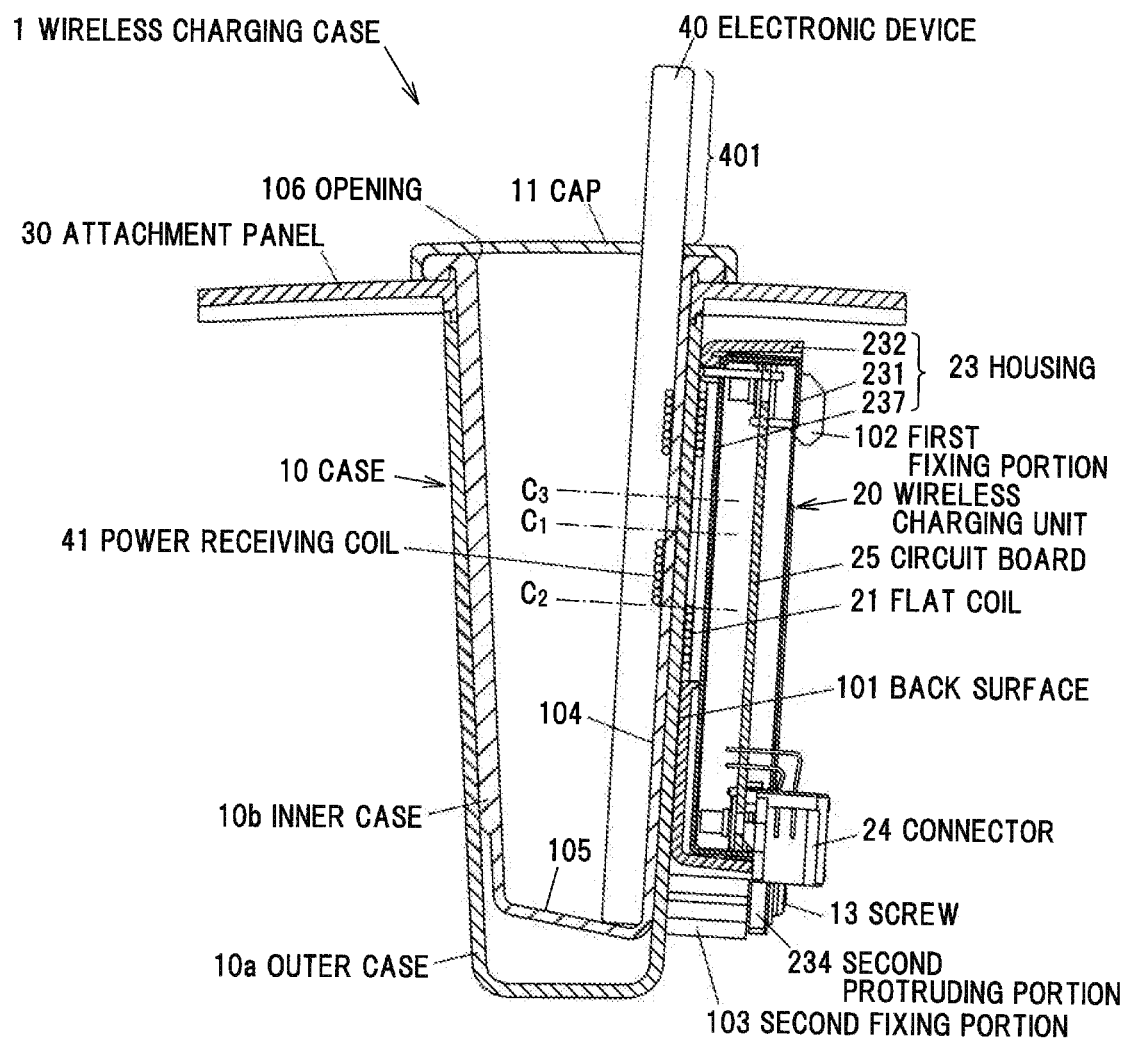
FIG. 5 is a vertical cross-sectional view showing the wireless charging case in the state that the electronic device having internally a power receiving coil is placed.

FIG. 5 is a vertical cross-sectional view showing the wireless charging case 1 in the state that an electronic device 40 having internally a power receiving coil 41 is placed. As shown in FIG. 5, the electronic device 40 is placed in the case 10 along an inner surface 104 of the side wall on the side where the wireless charging unit 20 is attached, so that a surface on the side where the power receiving coil 41 is arranged (e.g., when the electronic device 40 is a smartphone, a surface opposite to the surface on which a display screen is provided) faces the inner surface 104.

A dash-dot line $C_3$ in FIG. 5 indicates the position of the center of the power receiving coil 41 in the in-plane direction inside the electronic device 40. In general, the power receiving coil 41 is arranged close to the center of the electronic device 40. Thus, the position of the center of the electronic device 40 in the in-plane direction substantially coincides with the position indicated by the dash-dot line $C_3$.

To perform wireless charging via electromagnetic induction, the position of the power supplying coil 21 of the wireless charging unit 20 relative to the power receiving coil 41 of the electronic device 40 is such that a magnetic field generated by a current flowing through the power supplying coil 21 passes on the inner side of the power receiving coil 41. Thus, when the position of the center $C_1$ of the power supplying coil 21 in the in-plane direction and the position of the center $C_3$ of the power receiving coil 41 in the in-plane direction are close to each other to some extent, it is possible to wirelessly charge and it is also possible to support the electronic device 40 with various sizes.

In the wireless charging unit 20, the center $C_1$ of the power supplying coil 21 is located above the center $C_2$ of the housing 23 in the in-plane direction of the power supplying coil 21, as described above. This is so that the position allowing for wireless charging of the electronic device 40 inside the case 10 is raised as high as possible. In this configuration, the height of an upper portion 401 of the electronic device 40 protruding outward from the case 10 is increased since the depth of an inner bottom surface 105 of the case 10 is decreased, and it is thus easy to grip the protruding portion 401 and take out the electronic device 40. In addition, since the portion 401 largely protrudes, the electronic device 40 placed in the case 10 is easily seen from the outside and is thus prevented from being left more easily.

When the first protruding portions 233 of the housing 23 are used to attach the wireless charging unit 20 to the case 10 as shown in FIG. 1, forming the first protruding portions 233 to protrude sideward from both sides of the housing 23 allows the position of attaching the wireless charging unit 20 to the case 10 to be set higher (closer to the opening 106 of the case 10) than when the first protruding portions 233 are formed to protrude upward from the upper edge of the housing 23. As a result, the height of the upper portion 401 of the electronic device 40 protruding outward from the case 10 is further increased and the electronic device 40 can be taken out more easily. In addition, positioning accuracy of the power supplying coil 21 relative to the case 10 is increased by forming the first protruding portions 233 to protrude sideward from both sides of the housing 23.

Figure 6:
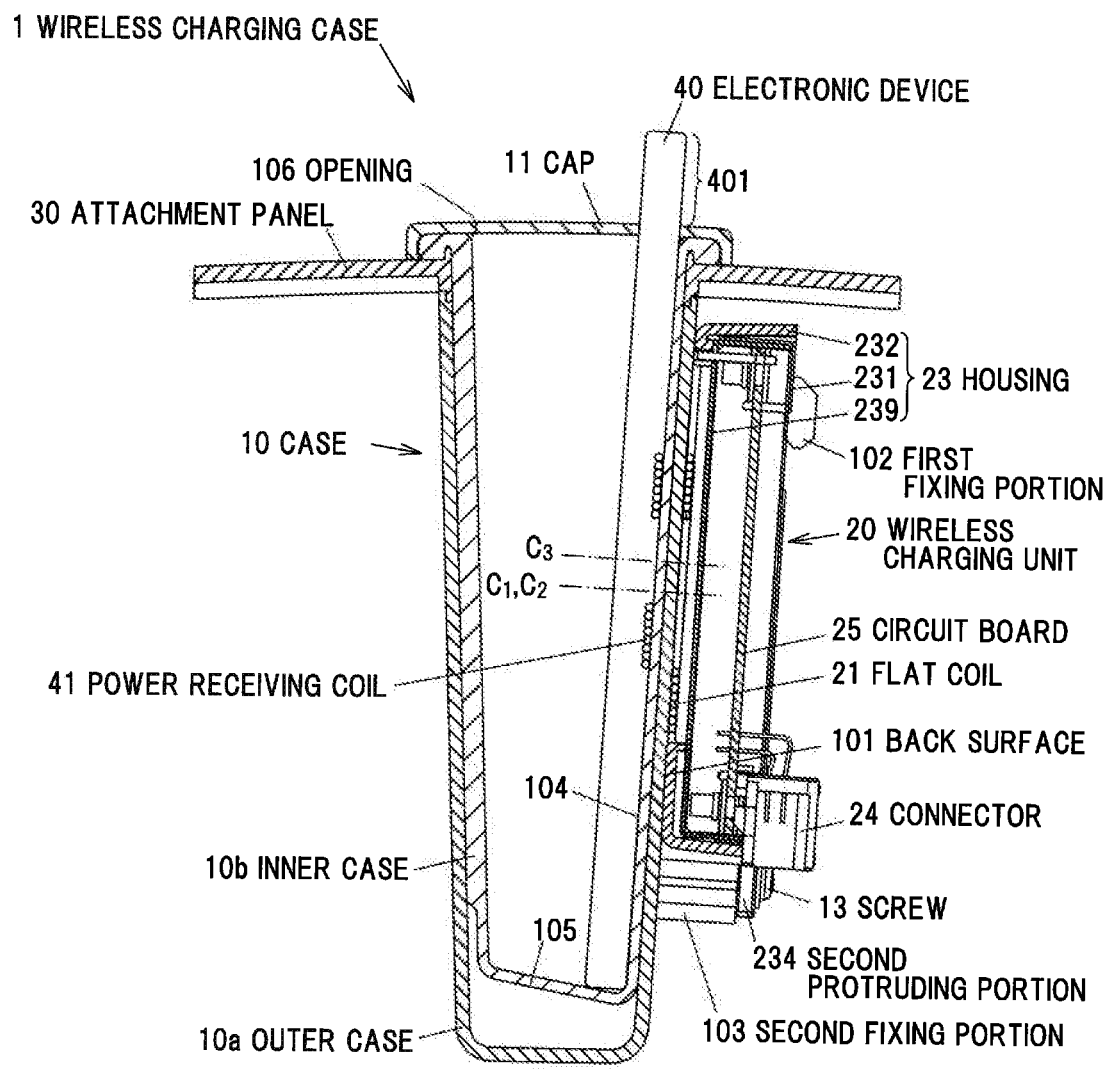
FIG. 6 is a vertical cross-sectional view showing the wireless charging case as Comparative Example.

FIG. 6 is a vertical cross-sectional view showing the wireless charging case 1 as Comparative Example in which the center $C_1$ of the power supplying coil 21 is located in the vicinity of the center $C_2$ of the housing 23 in the in-plane direction of the power supplying coil 21. In this case, the position allowing for wireless charging of the electronic device 40 inside the case 10 is lower than when the center $C_1$ of the power supplying coil 21 is located above the center $C_2$ of the housing 23. Therefore, the height of the upper portion 401 of the electronic device 40 protruding outward from the case 10 is small and it is difficult to grip the protruding portion 401 and take out the electronic device 40. In addition, depending on the size of the electronic device 40 to be placed in the case 10, there may be a case where it is possible to wirelessly charge but the height of the portion 401 protruding outward from the case 10 is nearly zero.

To raise the position allowing for wireless charging of the electronic device 40 inside the case 10, the position of the power supplying coil 21 on the wireless charging unit 20 is preferably as high as possible. For example, a distance between the upper end of the power supplying coil 21 and the upper end of the housing 23 in the in-plane direction of the power supplying coil 21 is preferably not more than 1 cm, more preferably, not more than 6 mm.

In addition, since water drops when generated due to condensation, etc., flow down to the lower side of the wireless charging unit 20, deposition of water on the power supplying coil 21 can be prevented by positioning the center $C_1$ of the power supplying coil 21 above the center $C_2$ of the housing 23. In this regard, condensation is generated when a temperature difference between the inside and the outside of the case 10 becomes large, e.g., when the temperature of the wireless charging unit 20 is elevated due to quick charge, etc., in a low temperature surrounding.

In addition, since the wireless charging unit 20 is configured that the center $C_1$ of the power supplying coil 21 is located above the center $C_2$ of the housing 23, lead wires 22 led out from both ends (the winding start end and the winding finish end) of the power supplying coil 21 are led out to the upper side of the housing 23, as shown in FIG. 4. Therefore, water drops, etc., due to condensation can be prevented from entering the housing 23 through the opening for letting in the lead wires 22.

Since the electronic device 40 is placed upright in the case 10, its vertical position is determined by the depth of the inner bottom surface 105 of the case 10. Therefore, misalignment of the electronic device 40 in the vertical direction hardly occurs and the electronic device 40 can be accurately placed in the position allowing for wireless charging even when only one power supplying coil 21 is provided. Thus, unlike conventional flat wireless charging devices, the wireless charging case 1 does not need to increase the chargeable area for placing the electronic device by a method using plural power supplying coils, etc., and the manufacturing cost can be reduced.

Although the case 10 in the example shown in FIG. 5 has an outer case 10a formed of a hard resin and an inner case 10b formed of a soft resin and arranged inside the outer case 10a, the configuration of the case 10 is not limited to that shown in FIG. 5. In the example shown in FIG. 5, the back surface 101 of the side wall of the case 10 is the back surface of the side wall of the outer case 10a, and the inner surface 104 of the side wall of the case 10 and the inner bottom surface 105 of the case 10 are respectively an inner surface of the side wall of the inner case 10b and an inner bottom surface of the inner case 10b. In this case, it is possible to change the depth of the bottom surface 105 by using the various inner cases 10b with different depths.

EFFECTS OF THE EMBODIMENT

In the wireless charging case 1 in the embodiment of the invention, since the components for wireless charging are unitized into the wireless charging unit 20 and can be attached and detached to/from the case 10, maintainability of such components is excellent. In addition, since the wireless charging unit 20 is configured that the center $C_1$ of the power supplying coil 21 is located above the center $C_2$ of the housing 23, the position allowing for wireless charging of the electronic device 40 inside the case 10 is raised and it is thus possible to easily take out the electronic device 40 from the case 10 and easily see the electronic device 40 from the outside.

Although the embodiment of the invention has been described, the invention is not intended to be limited to the embodiment, and the various kinds of modifications can be implemented without departing from the gist of the invention. In addition, the constituent elements in the embodiment can be arbitrarily combined without departing from the gist of the invention.

In addition, the invention according to claims is not to be limited to the embodiment. Further, it should be noted that all combinations of the features described in the embodiment are not necessary to solve the problem of the invention.

The invention claimed is:

1. A wireless charging unit to be attached to a back surface of a side wall of a case in which an electronic device comprising internally a wireless power receiving coil is placed upright, comprising:

a power supplying coil provided at a position facing the back surface of the side wall of the case to wirelessly supply power;

a circuit board connected to the power supplying coil to feed a current to the power supplying coil; and a housing that houses the circuit board, wherein the center of the power supplying coil is located above the center of the housing in an in-plane direction of the power supplying coil, and wherein the power supplying coil overlaps with the circuit board in a direction perpendicular to the in-plane direction of the power supply coil.

2. The wireless charging unit according to claim 1, wherein lead wires led out from the power supplying coil are led out to the upper side of the housing.

3. The wireless charging unit according to claim 1, wherein a distance between the upper end of the power supplying coil and the upper end of the housing in the in-plane direction of the power supplying coil is not more than 1 cm.

4. The wireless charging unit according to claim 1, wherein the housing comprises an opening provided on a surface facing the back surface of the side wall of the case to expose the power supplying coil, and the power supplying coil is arranged within the opening.

5. The wireless charging unit according to claim 1, wherein the case is installed on a center console of a car.

6. The wireless charging unit according to claim 1, wherein the housing includes an upper plate arranged between the circuit board and the power supplying coil, and wherein the upper plate covers the circuit board.

7. The wireless charging unit according to claim 1, wherein the housing includes an upper plate arranged between the circuit board and the power supplying coil, and wherein the housing includes:
  a bottom plate on which the circuit board is mounted;
  the upper plate placed on the bottom plate so that the circuit board is covered; and
  a cover arranged on an outer side of the upper plate and fixed to the bottom plate.

8. The wireless charging unit according to claim 1, wherein circuit board is positioned behind the power supplying coil with respect to the back surface of the side wall of the case.

9. The wireless charging unit according to claim 1, wherein the power supplying coil is disposed approximately 5 mm from the back surface of the side wall of the case.

10. The wireless charging unit according to claim 1, wherein the center of the power supplying coil is set based on a distance from the wireless power receiving coil to a bottom of the case.

11. The wireless charging unit according to claim 1, wherein the housing includes an opening which is formed on a surface facing the back surface of the side wall of the case.

12. The wireless charging unit according to claim 5, wherein a surface of the power supplying coil exposed to the case via the opening is covered with a noise reduction filter.

13. The wireless charging unit according to claim 5, wherein a surface of the power supplying coil exposed to the case via the opening is covered with a cover.

14. The wireless charging unit according to claim 11, wherein the power supplying coil is arranged within the opening.

15. The wireless charging unit according to claim 11, wherein the power supplying coil is exposed to the case via the opening.

16. The wireless charging unit according to claim 15, wherein a surface of the power supplying coil exposed to the case via the opening is covered with a noise reduction filter.

17. The wireless charging unit according to claim 15, wherein a surface of the power supplying coil exposed to the case via the opening is covered with a cover.

18. The wireless charging unit according to claim 1, wherein the case includes an inner case and an outer case, and wherein the center of the power supplying coil is positioned based on a depth of the inner case.

19. The wireless charging unit according to claim 1, wherein a material of the inner case is different than a material of the out case.

20. The wireless charging unit according to claim 7, wherein the housing includes an upper plate arranged between the circuit board and the power supplying coil, wherein the bottom plate and the upper plate comprise a metal, and wherein the cover comprises a resin.

* * * * *